United States Patent [19]

Saito et al.

[11] Patent Number: 4,556,113

[45] Date of Patent: Dec. 3, 1985

[54] STRUCTURE FOR ATTACHING TINES FOR CULTIVATION BY REVERSIBLE ROTATION IN ROTARY CULTIVATING APPARATUS

[75] Inventors: Taro Saito, Osaka; Kazumi Umeki, Sakai; Takaaki Ohno, Sakai; Hirobumi Sakane, Sakai; Masahide Tsujino, Sakai; Keiichi Sanpei, Izumiohtsu; Yoshibumi Nagamine, Habikino; Yoshitaka Sato, Sakai, all of Japan

[73] Assignee: Kubota Ltd., Osaka, Japan

[21] Appl. No.: 547,944

[22] Filed: Nov. 2, 1983

[30] Foreign Application Priority Data

Nov. 6, 1982 [JP] Japan .............................. 57-195011

[51] Int. Cl.⁴ ...................... A01B 33/02; A01B 33/14
[52] U.S. Cl. ...................................... 172/91; 172/123
[58] Field of Search ...................... 172/91, 96, 94, 45, 172/123, 550, 548, 125, 43; 56/294

[56] References Cited

U.S. PATENT DOCUMENTS

| 2,990,667 | 7/1961 | Schwalm | 56/294 |
| 3,093,951 | 6/1963 | Barrows | 172/45 |
| 3,557,880 | 1/1971 | Lely | 172/91 |
| 3,952,811 | 4/1976 | Carre | 172/45 |
| 4,492,271 | 1/1985 | Doering | 172/123 |

FOREIGN PATENT DOCUMENTS

| 2551857 | 6/1977 | Fed. Rep. of Germany | 172/96 |
| 7424037 | 3/1975 | France | 56/294 |

Primary Examiner—Richard J. Johnson
Attorney, Agent, or Firm—Birch, Stewart, Kolasch & Birch

[57] ABSTRACT

Cultivating tines, each having opposite cutting edges, are pivotably supported by tine mount members on a tine shaft reversibly rotatable about a horizontal lateral axis. One of the cutting edges of the tine is retainable in a position rearward with respect to the direction of forward rotation, while the other cutting edge is retainable in a position rearward with respect to the direction of reverse rotation. When held in each of these positions, the tine is restrained by resistant force imparting means from being pivotally moved by a centrifugal force. The resistant force to be imparted by this means is smaller than the reaction to be produced when the tine is driven into the soil.

7 Claims, 18 Drawing Figures

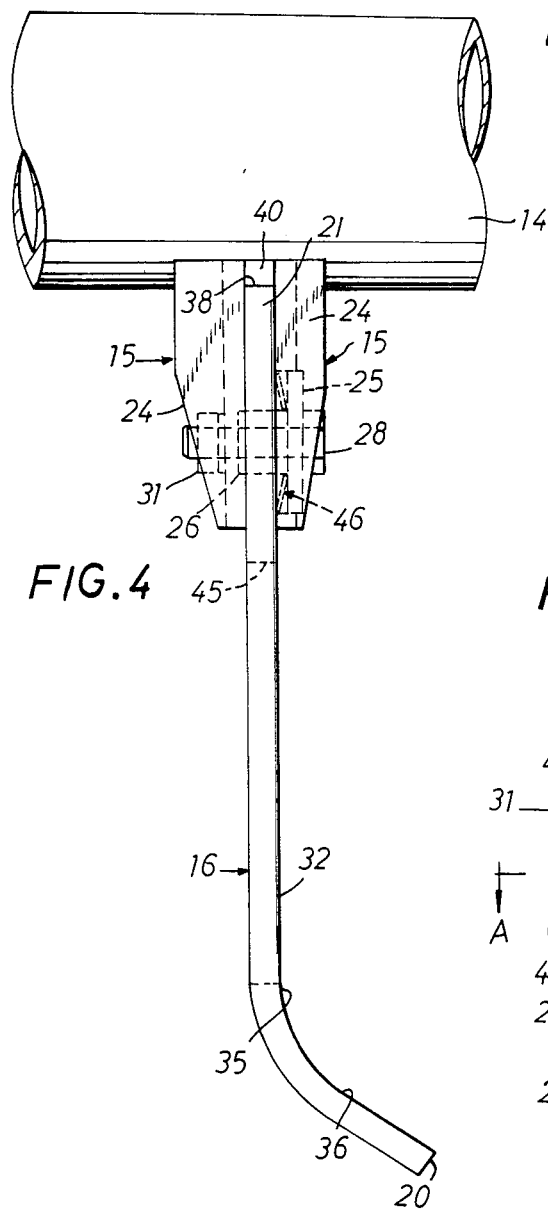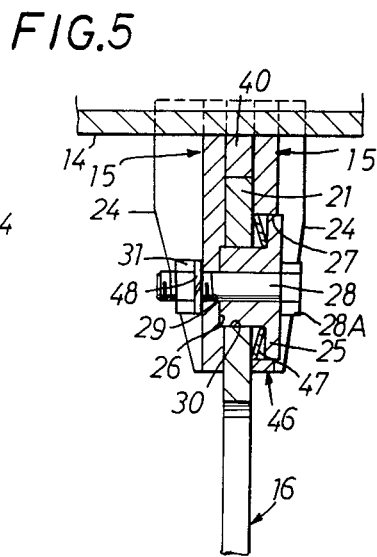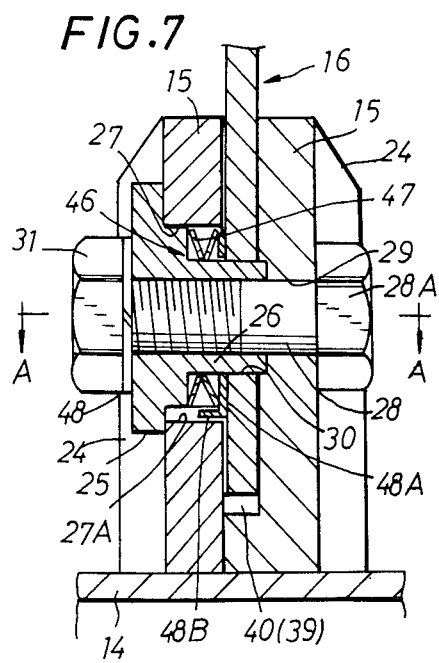

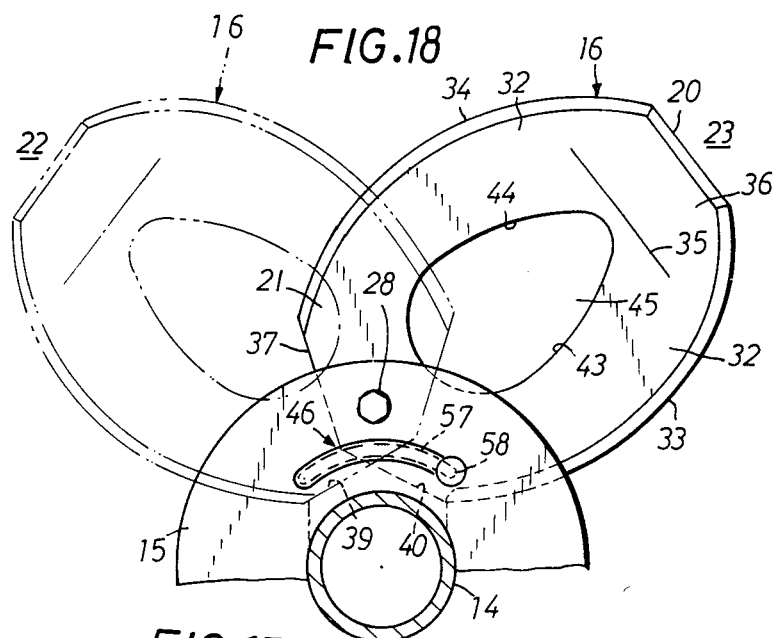
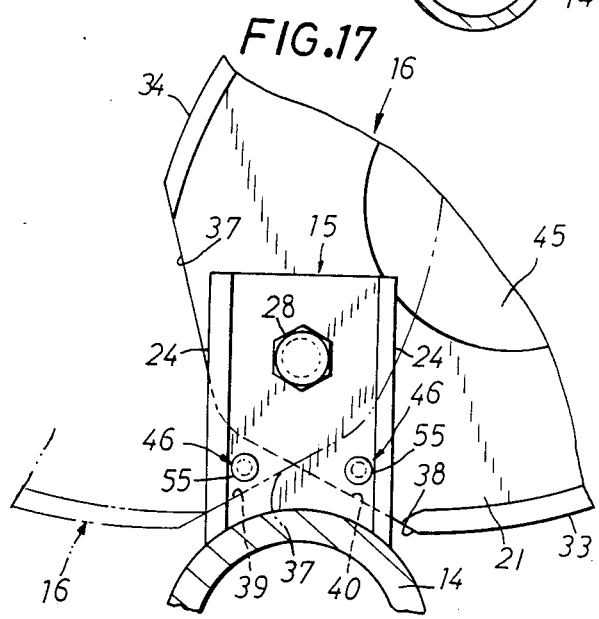
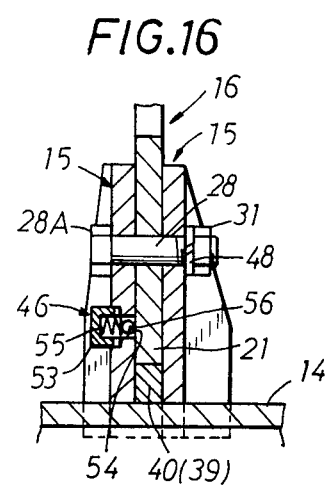

STRUCTURE FOR ATTACHING TINES FOR CULTIVATION BY REVERSIBLE ROTATION IN ROTARY CULTIVATING APPARATUS

BACKGROUND OF THE INVENTION

Rotary cultivating apparatus are proposed, for example, in Published Examined Japanese Utiliy Model Application Nos. SHO 41-1925 and SHO 49-7124 which are adapted to perform upcutting work or downcutting work selectively in accordance with the kind of crop or field conditions.

The conventional apparatus of the former publication includes tines which are attached to a reversibly rotatable tine shaft. The tine has divided blade portions spaced away from each other in the direction of rotation to form a space therebetween and joined together at the base and forward end portions of the tine. However, the angle at which the cutting edge of the tine is driven into the soil is not adjustable, so that if the angle is too large, a great impact force acts on the base portion to cause premature damage to the tine.

With the apparatus of the latter publication, upcutting tines or downcutting tines are alternatively attached to a tine shaft by replacement. It is therefore very cumbersome to replace the tines which are large in number.

To assure stable germination and growth of seedlings when directly sowing crops in the field after harvesting rice, wheat or the like, attention has recently been directed to upcutting rotary cultivators which are equipped with a rake and adapted to perform both upcutting work and downcutting work.

For example, Published Unexamined Japanese Patent Application No. SHO 57-83202 discloses a cultivator which singly is adapted for either of upcutting and downcutting work and in which the direction of rotation is changed by setting the apparatus in an opposite direction with respect to the tractor, with the rear cover shifted alternatively to a front position or rear position.

However, the shift of the rear cover, which has a levelling portion and is biased toward the ground, requires heavy labor and a complicated and expensive structure.

SUMMARY OF THE INVENTION

The present invention relates to a structure for attaching to a rotary cultivating apparatus tines which are adapted for cultivation by either forward rotation or reverse rotation.

An object of the invention is to provide a structure for attaching tines to a reversibly rotatable tine shaft for cultivation by reversible rotation by which structure the tines can be held at an optimum angle at which they are driven into the soil for either of upcutting and downcutting, without the need to remove and reattach the tines and further without necessitating forward or rearward shift of the rear cover.

Another object of the invention is to provide a tine attaching structure of the type described by which the tines are automatically shiftable to an upcutting position or downcutting position and which is less likely to give off noises although the tines are pivotably supported by the tine shaft.

Another object of the invention is to provide a tine attaching structure of the type described wherein each tine is pivotally attached to tine mount members on the tine shaft by a bolt-and-nut fastening member, the bolt being inserted through a cylindrical collar so as not to be subjected to a shearing force and to thereby assure high durability.

To fulfill these objects, the present invention provides a structure by which tines are attached, each at its base portion, to a tine shaft reversibly rotatable about a lateral axis, the tine including a blade portion and edge portions for forward rotation and reverse rotation formed at opposite sides of the blade portion. The structure is characterized in that the base portion of the tine is supported by tine mount members on the tine shaft and is pivotally movable about a lateral axis, holding means provided between the tine shaft and the tine for holding the tine in a forward inclined position wherein the forward end of the tine is positioned rearward from its base portion with respect to the direction of forward rotation or in a reverse inclined position wherein the forward end of the tine is positioned rearward from its base portion with respect to the direction of reverse rotation, means provided between the tine and the tine shaft for imparting a resistant force to the tine to prevent the tine from being brought into a pivoted position intermediate between the forward inclined position and the reverse inclined position by a centrifugal force resulting from the rotation of the tine shaft, the resistant force imparting means being adjustable to a resistant force smaller than the reaction produced when the tine is driven into the soil by forward rotation or reverse rotation.

BRIEF DESCRIPTION OF THE DRAWINGS

FIG. 3 to FIG. 6 show a first embodiment of the invention, FIG. 3 being a side elevation, FIG. 4 being a front view, FIG. 5 being a front view in section, FIG. 6 being a side elevation in section;

FIG. 7 to FIG. 10 show a second embodiment of the invention, FIG. 7 being a side elevation in section, FIG. 8 being a view in section taken along the line A—A in FIG. 7, FIG. 9 being a front view with a nut and a tine omitted, FIG. 10 being a rear view with the tine omitted;

FIG. 16 is a front view in section showing modified resistant force imparting means;

FIG. 17 is a side elevation in section of FIG. 16; and

FIG. 18 is a side elevation showing another modified resistant force imparting means.

DESCRIPTION OF THE PREFERRED EMBODIMENTS

Figure 1:
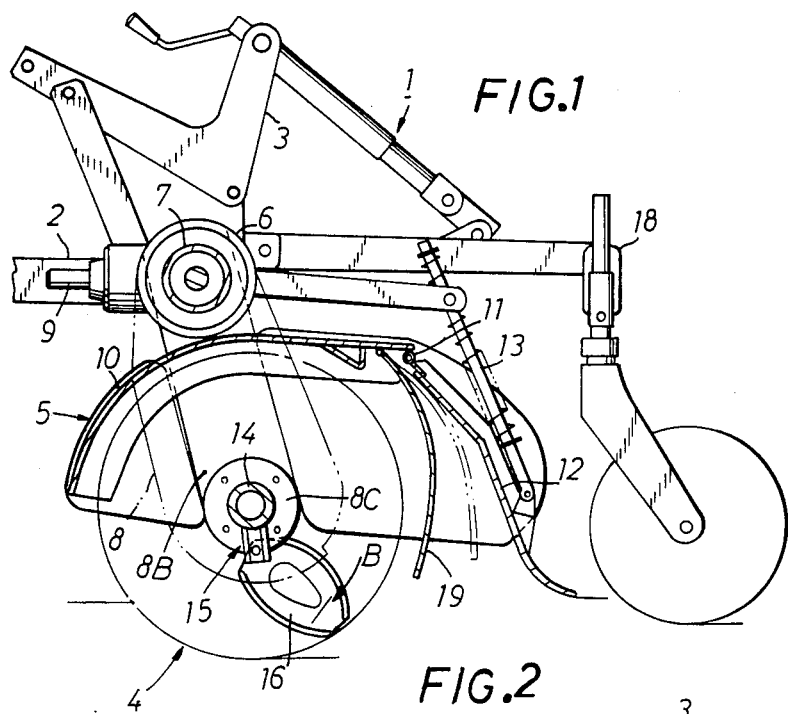
FIG. 1 is a side elevation partly broken away and showing a rotary cultivator.

With reference to FIGS. 1 to 6 showing a first embodiment of the invention, particularly to FIG. 1 showing the overall construction thereof, a rotary cultivator 1 is upwardly or downwardly movably attached to an unillustrated tractor by a three-point link assembly 2.

The rotary cultivator 1 primarily comprises a frame 3, a tiller unit 4, a cover assembly 5, etc. The frame 3 includes arms 7 extending from a power input case 6 laterally in opposite directions. The arm 7 is fixedly provided with a transmission case 8 at its one end and a support plate 8B at the other end thereof.

Forwardly extending from the power input case 6 is a power input shaft 9, to which power is delivered from the PTO shaft of the unillustrated tractor. Via a forward-reverse change mechanism housed in the case 6 and not shown, the shaft 9 is coupled to transmission means 8A which is a wrapping connection transmission member in the present embodiment and which is housed in the case 8 shown in FIG. 2.

The cover assembly 5 comprises a fixed main cover 10 and a rear cover 12 flexibly connected to the main cover 10 by a hinge 11 for covering the tiller unit 5. The rear cover 12 is held biased toward the ground by spring support means 13.

The tiller unit 4 comprises a tine shaft 14 and a large number of cultivating tines 16 attached to the shaft 14 by tine mount members 15 secured to the shaft. With the present embodiment, the tine shaft 14 has one end supported by bearing means 17 on the transmission case 8 and the other end supported by bearing means 8C on the support plate 8B and is reversibly rotatable about a horizontal lateral axis through the transmission means 8A.

Figure 2:
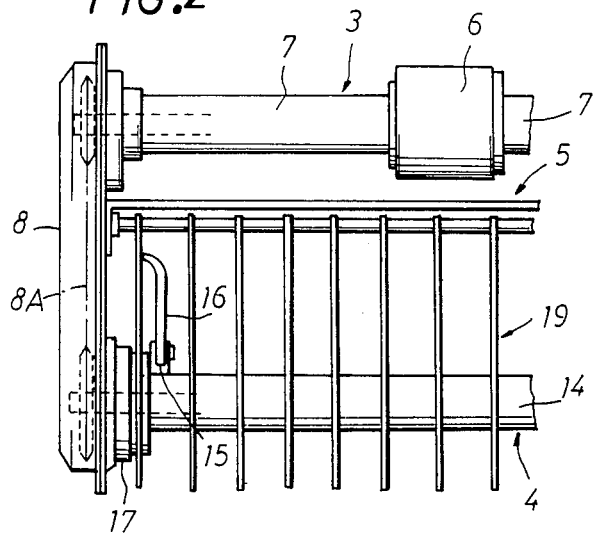
FIG. 2 is a fragmentary rear view of the same.

Further as shown in FIG. 1, the frame 3 has a gauge wheel assembly 18, while the cover assembly 5 is provided with a rake assembly 19 behind the tiller unit 4. As seen in FIG. 2, the rake assembly 19 includes a row of rake bars.

Each of the multiplicity of tines 16 is attached to the reversibly rotatable tine shaft 14 by one pair of tine mount members 15 and is retainable in a forward inclined position 22 in which the forward end 20 of the tine is positioned rearward from its base portion 21 with respect to the direction of forward rotation, or alternatively in a reverse inclined position 23 in which the forward end 20 is positioned rearward from its base portion 21 with respect to the direction of reverse rotation.

According to the first embodiment shown in FIGS. 3 to 6, the tine mount members 15 are opposed to each other and welded to the outer periphery of the tine shaft 14 to hold the base portion 21 of the tine 16 therebetween axially of the shaft 14. Each of the mount members 15 has front and rear flanges 24 projecting outward axially of the shaft 14 away from the other mount member 15. One of the mount members 15 has a fitting bore 27 formed axially of the shaft for receiving therein a cylindrical collar 26 having a flange 25 at its one end. The other mount member 15 has a bore 29 in alignment with the bore 27 for inserting therethrough a fastening bolt 28.

The tine 16 is formed at its base 21 with a bore 30 for inserting the cylindrical portion of the collar 26 therethrough. The base portion 21 is fitted in between the opposed mount members 15, and the collar 26 is inserted into the bores 27 and 30 axially of the tine shaft. The tine is held in place by fastening means comprising the bolt 28 and a nut 31 and is pivotally movable on the cylindrical portion about the axis of the fastening bolt 28.

The tine 16 includes a blade portion 32 extending from the base portion 21 to the forward end portion 20 and edge portions 33 and 34 formed at opposite sides of the blade portion 32. The forward end portion 20 beyond a bent part 35 has a rake face 36. The base edge of the base portion 21 is angular to provide engaged portions 37 and 38 engageable by the tine shaft assembly.

A spacer is fixedly provided between the base portions of the pair of mount members 15 and has engaging portions 39 and 40 which form an angular projection. When the tine 16 supported by the assembly of the tine shaft 14 and pivotable about the axis of the fastening bolt 28 is in the forward inclined position 22, the engaged portion 37 rearward with respect to the direction of forward rotation is in engagement with the corresponding engaging portion. Alternatively when the tine is in the reverse inclined position, the engaged portion 38 rearward with respect to the direction of reverse rotation is in engagement with the corresponding engaging portion 40. Thus the tine is retainable in each of these positions against either of reactions 41 and 42 resulting from upcutting (reverse rotation) and downcutting (forward rotation).

Thus the engaged portion 37 and the engaging portion 39 serve as means for holding the tine 16 in the forward inclined position 22 wherein the forward end 20 is positioned rearward from the base portion 21 with respect to the direction of forward rotation, while the engaged portion 38 and the engaging portion 40 serve as means for holding the tine 16 in the reverse inclined position 23 wherein the forward end 20 is positioned rearward from the base portion 21 with respect to the direction of reverse rotation. In each of these positions, the edge portion 33 or 34 is at an angle, i.e., cutting angle $\gamma$, with a curve representing the path of cutting motion, the angle $\gamma$ being greater than 0° but smaller than 90°. The edge portion 33 or 34 is curved in a direction opposite to the direction of rotation.

The tine 16 can be interpreted as being composed of a pair of hatchet-shaped tines which are joined together at the back portions 43 and 44 thereof. The back portions 43 and 44 define a hollow space 45, through which the soil sometimes engaged in the space between adjacent tines 16 is released.

The tine 16 may be composed of L-shaped tines or flower-shaped tines joined together. The hollow space 45 need not always be formed.

In either of upcutting work and downcutting work, the tine 16 is driven into the soil at the edge portion 33 or 34 progressively from its base portion toward its forward end, at a drive angle which is held by the holding means. When moving out of the soil, the tine 16 tends to pivotally move to an intermediate position between the positions 22 and 23 under the action of centrifugal force resulting from rotation, but this movement is prevented by resisting force imparting means 46 provided between the tine 16 and the tine shaft 14.

As best seen in FIG. 5, a first example of resistant force imparting means 46 comprises a dish spring 47 placed in the fitting bore 27 for the cylindrical collar 26, fitting around the cylindrical portion of the collar 26 and bearing on the outer surface of the base portion 21 and on the inner surface of the flange 25. By adjusting the degree of fastening by the bolt 28 and the nut 31, a frictional force overcoming the centrifugal force can be given. With this arrangement, the bolt 28 is turned by a tool engaging the head 28 thereof, with the nut 31 retained against rotation by an illustrated spring washer 48 or with the nut 31 in engagement with a retaining portion 49 formed on the outer side of the mount member 15, whereby the frictional force is adjustable axially of the tine shaft to overcome the centrifugal force.

Further as seen in FIG. 5, the inserted end of the collar 26 is fitted in a recess formed in the inner side of one of the mount members 15 so as not to subject the fastening bolt 28 to a shearing force.

The spring 47 constituting the resistant force imparting means 26 may comprise a plurality of dish springs which are fitted together, or a usual or conical coiled spring.

The resistant force, i.e., frictional force, to be imparted by the means 26 is adjustable to a magnitude smaller than the reactions 41 and 42 resulting when the tine is driven into the soil by forward rotation and reverse rotation, so that the tine is shiftable from forward inclined position to reverse inclined position and vice versa as desired upon a change of the direction of rotation of the tine shaft 14.

FIGS. 7 to 10 show another preferred embodiment of the invention, wherein a spacer having engaging portions 39 and 40 and projecting axially of a tine shaft 14 is formed on one of two tine mount members 15. The other mount member 15 is fitted to the end face of the projection. The mount members 15 fixedly extend from the outer periphery of the tine shaft 14 outward radially thereof. The outer ends of the mount members 15 are angular to reduce the resistance to be encountered in the soil.

A fitting bore 27 is elongated lengthwise of the mount member. The cylindrical portion of a cylindrical collar 26 has a stepped portion to provide a flange fitting in the elongated fitting bore 27. The collar 26 has an elongated flange 25 which is in engagement with engaging portions 24A formed on the opposed faces of flanges 24, whereby the collar is retained against rotation.

A washer 48A fitting around the cylindrical portion has a lug 48B which is engaged in a cutout 27A open to the bore 27, whereby the washer is held against rotation. Two dish springs 47 fitting around the cylindrical portion can be compressed by bolt-and-nut fastening means through the collar 26. The bolt head 28A is engaged with engaging portions 24B formed on the flanges 24 on the other mount member, whereby the bolt 28 is held against rotation.

With the exception of the above features, the second embodiment has the same construction as the first. Throughout the drawings mentioned, like parts are referred to by like reference numerals. The springs 47 can be compressed by tightening up the nut 31. The resistant force imparting means 46 thus constructed gives a frictional force which is adjustable in this way.

Figure 3:
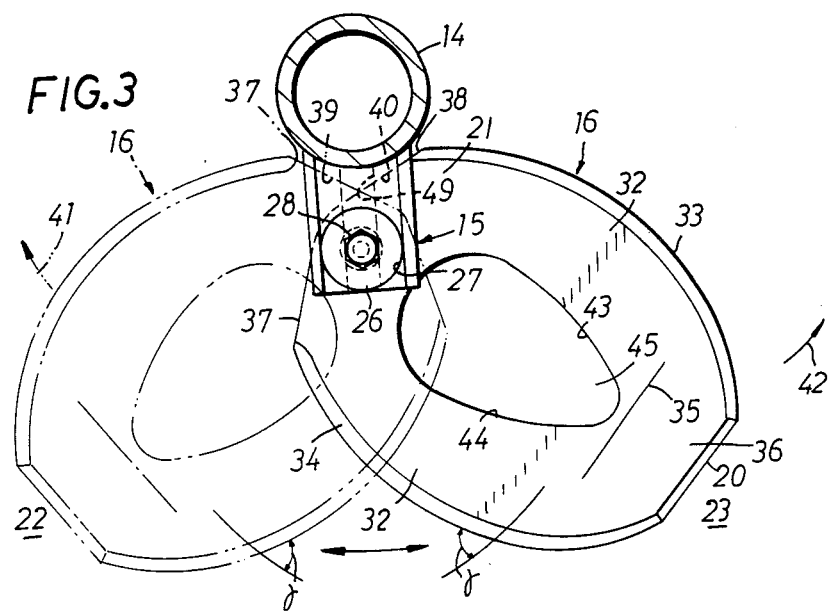
Figure 6:
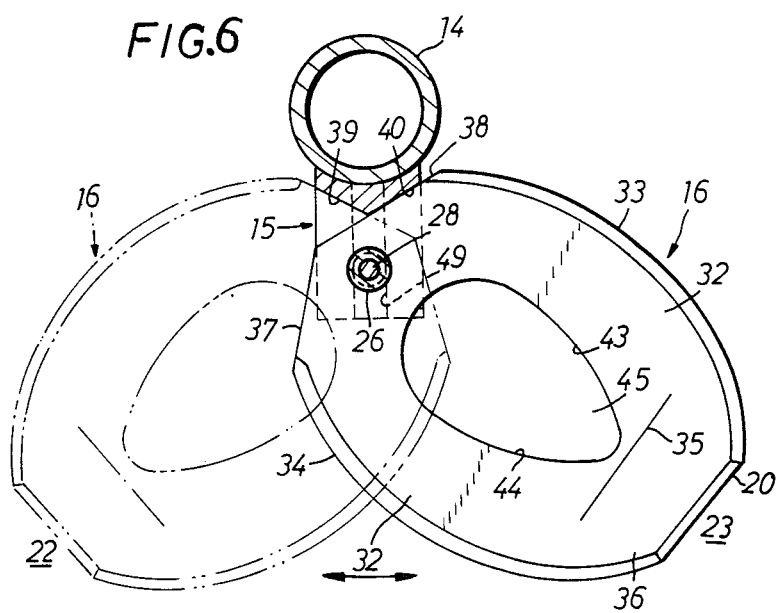
Figure 8:
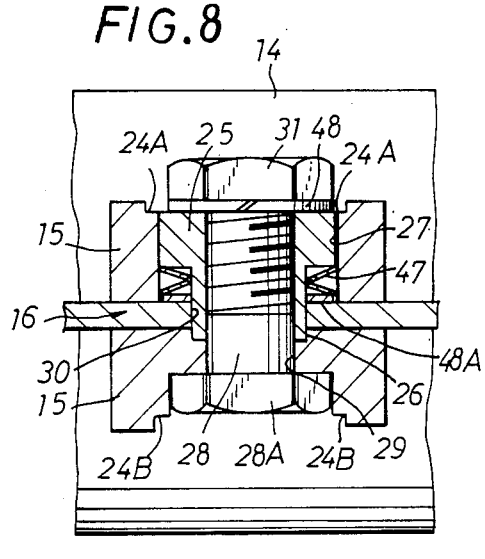
Figure 9:
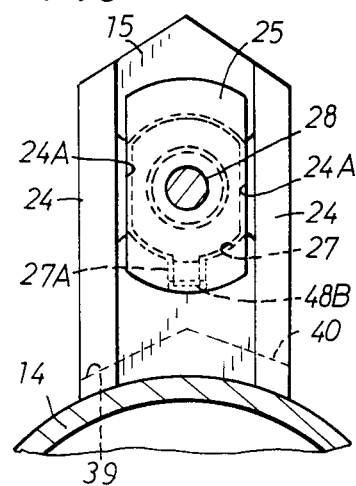
Figure 10:
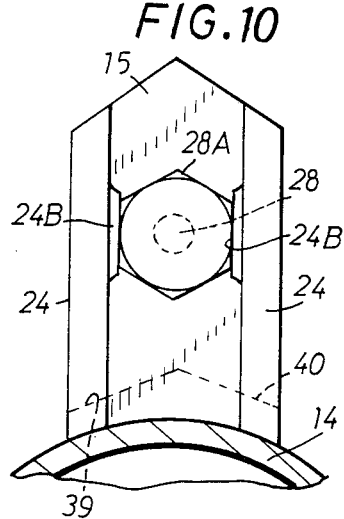
Figure 11:
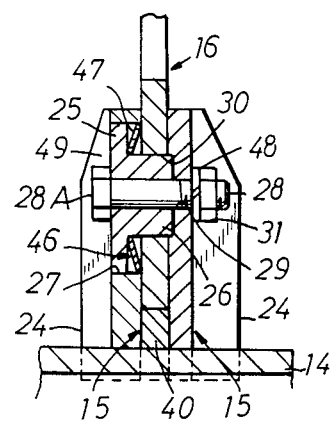
FIG. 11 to FIG. 14 are front views in section showing third to sixth embodiments.

FIG. 3 shows a third embodiment of tine attaching structure, wherein tine mount members 15 have flanges 24 projecting greatly beyond a bolt head 28A and nut 31 for protecting them. The flanges 24 also serve as reinforcing ribs against resistance acting axially of the tine shaft. With the exception of the above feature, the third embodiment has the same construction as the first, so that like parts are referred to by like numerals.

Figure 12:
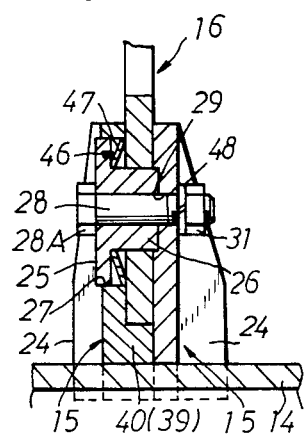

FIGS. 12 to 15 show tine mount members 15 for tine attaching structures which members are each formed by forging and are welded to a tine shaft 14. In the structure of FIG. 12, a spacer having engaging portions 39 and 40 is integral with one of tine mount members 15 and is welded to the other tine mount member 15. After the welding, the lower edges of the mount members 15 are generally welded to the tine shaft 14.

Figure 13:
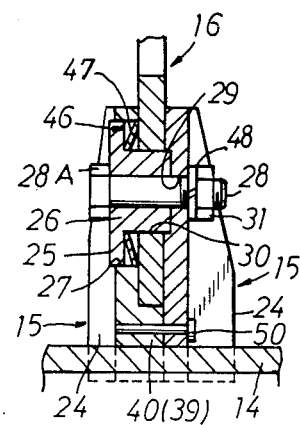

In the case of FIG. 13, the tine mount members 15 of FIG. 12 are assembled by a pin 50 and thereby held together and are then welded to a tine shaft 14 along the overall lower peripheral edge of the assembly. After the welding, the pin 50 may be removed or welded in place.

Figure 14:
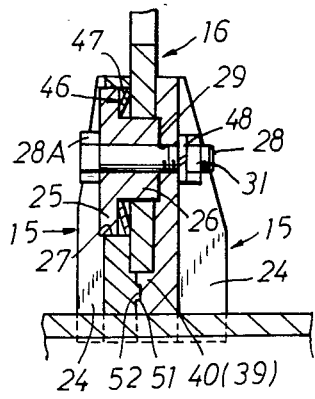
Figure 15:
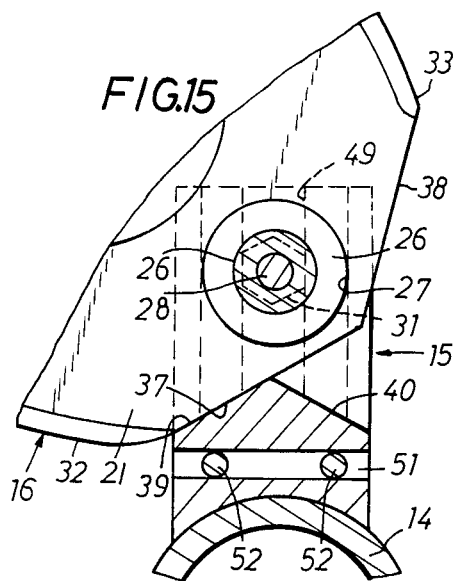
FIG. 15 is a side elevation in section of FIG. 14.

With the structure shown in FIGS. 14 and 15, a spacer having engaging portions 39 and 49 is integral with each of tine mount members 15 at the inner surface thereof. A recessed portion shown as a groove 51 is formed in one of the opposed surfaces, and at least two projections 52 are formed in the other surface. The opposed mount members 15 are positioned in place by the engagement of the projection 52 in the recessed portion 51. Subsequently, the fitting faces are welded together, and the overall lower peripheral edge of the assembly is welded to a tine shaft 14.

FIGS. 16 and 17 show a modification of the resistant force imparting means 46. Cap nuts 53 attached to front and rear portions of one of opposed mount members 15 are movable inward or outward in screw-thread engagement therewith. A spring accommdating bore 54 extending through the mount member 15 is also formed in the cap nut 53, and resistant force imparting members, i.e., a coiled spring 55 and a ball 56, are placed in the bore 54. As in the first embodiment, the resistant force thereby imparted is greater than the centrifugal force and smaller than the reaction forces 41 and 42.

The resistant force imparting means 46 of the modification may be formed in each of the pair of mount members 15. The cylindrical collar 26 can be dispensed with in the case of the modification.

FIG. 18 shows a tine mount member 15 which is in the form of a disk. The member 15 is formed with a groove 57 along a circumference. A ball 58 or slide shoe is engaged in the groove 57 like the above modification so as to impart a resistance force similarly.

In the foregoing embodiments, the tine 16 may be made retainable in either of the two positions 22 and 23 by engagement with an engaging portion formed on the outer periphery of the tine shaft 14.

The operation of the present structure will be described as it is used in the cultivator 1 having the rake assembly 19. The direction of reverse rotation for upcutting is shown by an arrow B in FIG. 1. In this case, the tine 16 is retained in the reverse inclined position 23 wherein the tine end is positioned rearward with respect to the direction of reverse rotation, and the tine is driven into the soil for cultivation.

The soil cut by the edge portion 34 of the tine 16 is turned over by the rake face 36, carried along the inner surface of the cover assembly 5 and screened by the rake assembly 19 to form a layer of cultivated soil wherein stalks and the like are embedded, and clods, fragement or particles of soil are positioned in upwardly decreasing order in size.

The tine is held in position by the holding means 38 and 40 when driven into the soil, while it is prevented by the resistant force imparting means 46 from moving to a pivoted position under the action of a centrifugal force when brought out of the soil.

When the reverse rotation of the tine shaft 14 is changed to forward rotation for downcutting, the tine 16 is turned about the fastening bolt 28 by the resistance encountered when it is driven into the soil, and is automatically brought to the forward inclined position 22, in which it is retained by the holding means 37 and 39. The tine 16 is prevented from moving circumferentially of the tine shaft owing to a centrifugal force during downcutting.

According to the present invention, the tine can be held in the forward inclined position or in the reverse inclined position when the tine shaft is driven forward or reversely, so that the soil can be cultivated most suitably with reduced impact.

Further because the tine is prevented by the resistant force imparting means from being brought to an unstable pivoted position intermediate between the two inclined positions by a centrifugal force, the structure assures a stable cultivating operation with reduced noise.

The tine is automatically shiftable to the forward position or reverse position since the resistance to be given by the imparting means is made smaller than the reaction produced when the tine is driven into the soil.

What is claimed is:

1. In a rotary cultivating apparatus, a structure for attaching tines for cultivation by reversible rotation wherein the tines are attached, each at its base portion, to a tine shaft reversibly rotatable about a lateral axis, the tine including a blade portion and edge portions for forward rotation and reverse rotation formed at opposite sides of the blade portion, the structure being characterized in that the base portion of the tine is supported by tine mount members on the tine shaft and is pivotally movable about a lateral axis, holding means provided between the tine shaft and the tine for holding the tine in a forward inclined position wherein the forward end of the tine is positioned rearward from its base portion with respect to the direction of forward rotation or in a reverse inclined position wherein the forward end of the tine is positioned rearward from its base portion with respect to the direction of reverse rotation, said holding means including a spacer provided between a pair of mount members secured to the tine shaft and having engaging portions which form an angular projection and engaged portions formed in an angular shape at the base of the tine and each adapted to bear on the corresponding one of the engaging portions of the spacer, the base portion of the tine being provided between the tine mount members pivotably about the second lateral axis, each of the engaged portions being engageable by the corresponding portion of the spacer, means provided between the tine and the tine shaft for imparting a resistant force to the tine to prevent the tine from being brought into pivoted position intermediate between the forward inclined position and the reverse inclined position by a centrifugal force resulting from the rotation of the tine shaft, the resistant force imparting means being adjustable to a resistant force smaller than the reaction produced when tine is driven into the soil by forward rotation or reverse rotation.

2. A structure as defined in claim 1 wherein one of the tine mount members is formed at the base portion of its inner surface with the spacer projecting therefrom axially of the tine shaft, and the inner surface of the other tine mount member is fixedly fitted to the projecting end of the spacer.

3. A structure as defined in claim 1 wherein the base portion of each of the tine mount members is projected from its inner surface axially of the tine shaft to form the spacer, and the tine mount members are positioned in place by a recessed portion formed in one of the projected ends and projections formed on the other projected end.

4. A structure as defined in claim 1 wherein the resistant force imparting means comprises a cylindrical collar having a flange and a spring fitted around the cylindrical portion of the collar, and the cylindrical portion of the collar is inserted axially of the tine shaft through the base portion of the tine provided between the tine mount members, bolt-and-nut fastening means extending through the cylindrical portion and being tightened up to cause the spring to bear against the flange and impart a frictional force to the base portion of the tine.

5. A structure as defined in claim 1 wherein the resistant force imparting means comprises a ball pressed into contact with the base portion of the tine by a spring and a cap nut accommodating the spring therein and screwed in one of the mount members, the resistant force imparting means being provided at each of front and rear portions of of the mount member.

6. A structure as defined in claim 4 wherein the cylindrical collar is fitted to one of the tine mount members and held against rotation about its axis, and the end of the cylindrical portion of the collar is fitted in a recess portion formed in the other tine mount member, the collar being adapted to withstand a shearing force to render the bolt-and-nut fastening free from the shearing force.

7. A structure as defined in claim 6 wherein the spring is a dish spring, and the tine mount members are provided with means for preventing the bolt-and-nut fastening means from loosening.

* * * * *